United States Patent [19]
Ammons

[11] Patent Number: 5,820,205
[45] Date of Patent: Oct. 13, 1998

[54] RETRACTABLE AUTOMOTIVE HANGER

[76] Inventor: Thomas C. Ammons, 94 Cromwell Hill Rd., Monroe, N.Y. 10950

[21] Appl. No.: 774,761

[22] Filed: Dec. 30, 1996

[51] Int. Cl.⁶ ...................................................... B60R 7/10
[52] U.S. Cl. ............................ 296/214; 224/313; 224/927
[58] Field of Search .................................. 296/39.1, 214; 224/311, 313, 556, 927

[56] References Cited

U.S. PATENT DOCUMENTS

| | | | |
|---|---|---|---|
| 4,221,354 | 9/1980 | Kempkers | 224/927 X |
| 4,444,344 | 4/1984 | Marcus et al. | 224/313 |
| 4,720,028 | 1/1988 | Takemura et al. | 224/313 X |
| 5,226,569 | 7/1993 | Watjer et al. | 224/313 |
| 5,366,127 | 11/1994 | Heinz | 224/313 |

*Primary Examiner*—Dennis H. Pedder

[57] ABSTRACT

A new Retractable Automotive Hanger for providing a permanent automotive hanger which can be selectively deployed and retracted. The inventive device includes a hanger body pivotally attached to the vehicle roof, a recessed contour in the headliner of the vehicle which has a shape which generally matches the shape of the hanger body, apparatus for retaining the hanger body in a recessed position within the recessed contour of the headliner, and apparatus for retaining the hanger body in a deployed position ready for use.

14 Claims, 4 Drawing Sheets

RETRACTABLE AUTOMOTIVE HANGER

BACKGROUND OF THE INVENTION

1. Field of the Invention

The present invention relates to garment hangers and more particularly pertains to a new Retractable Automotive Hanger for providing a permanent automotive hanger which can be selectively deployed and retracted.

2. Description of the Prior Art

The use of garment hangers is known in the prior art. More specifically, garment hangers heretofore devised and utilized are known to consist basically of familiar, expected and obvious structural configurations, notwithstanding the myriad of designs encompassed by the crowded prior art which have been developed for the fulfillment of countless objectives and requirements.

Known prior art garment hangers include U.S. Pat. No. 4,936,491; U.S. Pat. No. 5,383,588; U.S. Pat. No. 4,664,267; U.S. Pat. No. 4,523,701; U.S. Pat. No. 5,226,569 and U.S. Pat. No. 4,444,344.

While these devices fulfill their respective, particular objectives and requirements, the aforementioned patents do not disclose a new Retractable Automotive Hanger. The inventive device includes a hanger body pivotally attached to the vehicle roof, a recessed contour in the headliner of the vehicle which has a shape which generally matches the shape of the hanger body, apparatus for retaining the hanger body in a recessed position within the recessed contour of the headliner, and apparatus for retaining the hanger body in a deployed position ready for use.

In these respects, the Retractable Automotive Hanger according to the present invention substantially departs from the conventional concepts and designs of the prior art, and in so doing provides an apparatus primarily developed for the purpose of providing a permanent automotive hanger which can be selectively deployed and retracted.

SUMMARY OF THE INVENTION

In view of the foregoing disadvantages inherent in the known types of garment hangers now present in the prior art, the present invention provides a new Retractable Automotive Hanger construction wherein the same can be utilized for providing a permanent automotive hanger which can be selectively deployed and retracted.

The general purpose of the present invention, which will be described subsequently in greater detail, is to provide a new Retractable Automotive Hanger apparatus and method which has many of the advantages of the garment hangers mentioned heretofore and many novel features that result in a new Retractable Automotive Hanger which is not anticipated, rendered obvious, suggested, or even implied by any of the prior art garment hangers, either alone or in any combination thereof.

To attain this, the present invention generally comprises a hanger body pivotally attached to the vehicle roof, a recessed contour in the headliner of the vehicle which has a shape which generally matches the shape of the hanger body, apparatus for retaining the hanger body in a recessed position within the recessed contour of the headliner, and apparatus for retaining the hanger body in a deployed position ready for use.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Retractable Automotive Hanger apparatus and method which has many of the advantages of the garment hangers mentioned heretofore and many novel features that result in a new Retractable Automotive Hanger which is not anticipated, rendered obvious, suggested, or even implied by any of the prior art garment hangers, either alone or in any combination thereof.

It is another object of the present invention to provide a new Retractable Automotive Hanger which may be easily and efficiently manufactured and marketed.

It is a further object of the present invention to provide a new Retractable Automotive Hanger which is of a durable and reliable construction.

An even further object of the present invention is to provide a new Retractable Automotive Hanger which is susceptible of a low cost of manufacture with regard to both materials and labor, and which accordingly is then susceptible of low prices of sale to the consuming public, thereby making such Retractable Automotive Hanger economically available to the buying public.

Still yet another object of the present invention is to provide a new Retractable Automotive Hanger which provides in the apparatuses and methods of the prior art some of the advantages thereof, while simultaneously overcoming some of the disadvantages normally associated therewith.

Still another object of the present invention is to provide a new Retractable Automotive Hanger for providing a permanent automotive hanger which can be selectively deployed and retracted.

Yet another object of the present invention is to provide a new Retractable Automotive Hanger which includes a hanger body pivotally attached to the vehicle roof, a recessed contour in the headliner of the vehicle which has a shape which generally matches the shape of the hanger body, apparatus for retaining the hanger body in a recessed position within the recessed contour of the headliner, and apparatus for retaining the hanger body in a deployed position ready for use.

Still yet another object of the present invention is to provide a new Retractable Automotive Hanger that provides convenient and permanent availability of a hanger in a vehicle, so as to prevent wrinkling of clothing.

Even still another object of the present invention is to provide a new Retractable Automotive Hanger that minimally detracts from the interior appearance of the vehicle when in the retracted position.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
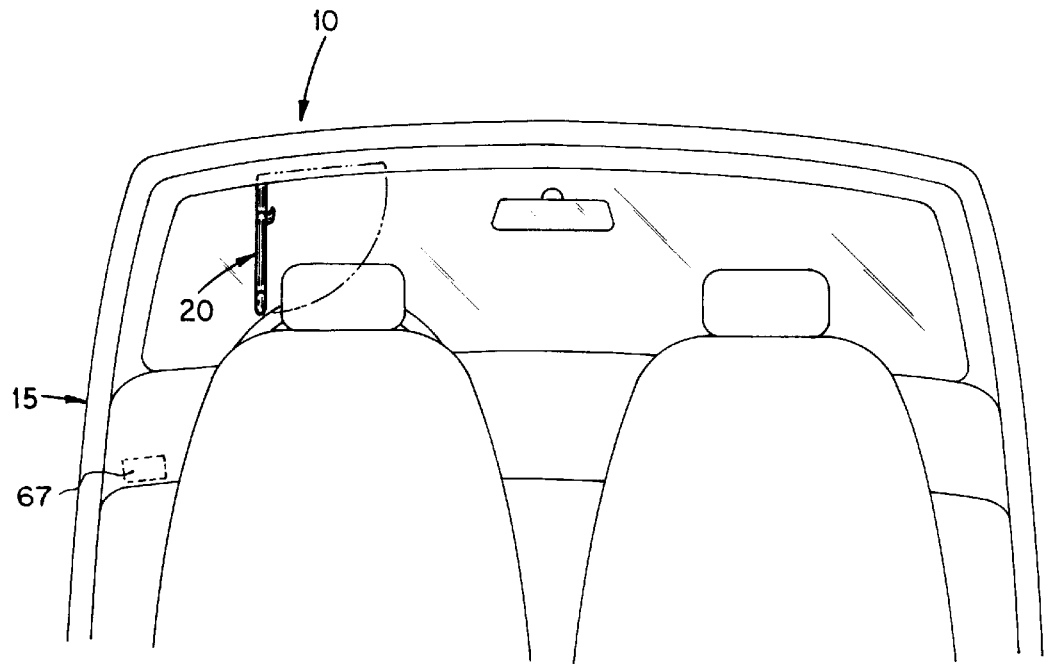
FIG. 1 is a rear view of the vehicle interior showing the retractable hanger according to the present invention.

With reference now to the drawings, and in particular to FIGS. 1 through 10 thereof, a new Retractable Automotive Hanger embodying the principles and concepts of the present invention and generally designated by the reference numeral 10 will be described.

More specifically, it will be noted that the Retractable Automotive Hanger 10 comprises a hanger body 20 pivotally attached to a roof 30 of the vehicle 15 and a headliner 40 having a recessed contour 45 which receives the hanger body when in the retracted position.

Figure 6:
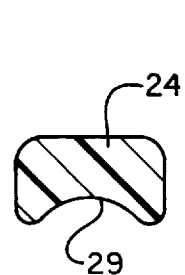
FIG. 6 is a cross sectional view taken along line 6—6 of FIG. 2.
Figure 7:
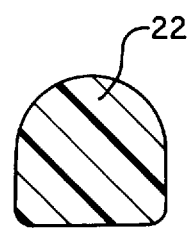
FIG. 7 is a cross sectional view taken along line 7—7 of FIG. 2.

As best illustrated in FIGS. 1 through 10, it can be shown that the hanger body 20 includes two angled arms 21,22 extending from a base member 23 of the hanger body and a longitudinally extending rod 24 connecting distal ends of the two arms, so as to give the hanger body a generally triangular shape. The angled arms can have any desired cross-sectional shape, such as the shape shown in FIG. 7. The longitudinal rod 24 can have any desired shape, but preferably has a shape as shown in FIG. 6. The bottom of the rod includes a semi-circular recess 29 sized for contact with a persons fingers. The base member 23 includes a hook 25 attached thereto for hanging items such as cleaning and luggage bags from the hanger body. An aperture 26 is formed through an upper portion of the base member, the purpose of which will become apparent later. The top of the base member 23 defines a flat, spring engaging surface 27, and extending from the flat surface on the same side of the hanger body as the hook is a spring engaging projection 28, the functions of which will be later described.

Attached in an appropriate fashion to the vehicle roof 30 is a clevis member 31. For instance, the clevis member can be attached using an epoxy adhesive. The clevis member 31 has a flat base portion 32 attached to the roof, with two spaced clevis arms 33,34 extending from the base portion. The two arms 33,34 are spaced apart a distance slightly greater than the width of the base member 23 in order to allow the base member to fit between the two arms 33,34, while permitting the base member to freely pivot relative to the clevis arms. Each clevis arm includes a hole 35,36 in the respective arm for receiving a pivot shaft 37 attaching the hanger body to the clevis member 31. Note that the pivot shaft should fit snugly within the holes 35,36 in the clevis arms 33,34, but pass freely through the hole 26 in the base member 23 in order to permit pivoting movements of the base member.

The headliner 40 is secured to the roof, and surrounds the clevis member 31. The headliner is normally a part of every vehicle and is installed during assembly of the vehicle. Headliners are usually formed of a foam liner 41 with a fabric covering 42. Since headliners are well known in the art, further details of the headliner are not provided herein. It is only important that the vehicle be provided with some form of a headliner.

Formed in the headliner 40 is a recessed contour 45 for receiving the hanger body in its retracted state. The contour 45 includes two angled recessed portions 46,47 sized and shaped to receive the two angled arms 21,22, a longitudinal recessed portion 48 sized and shaped to receive the longitudinal rod 24, and a recessed portion 49 sized and shaped to receive the base member 23. The recessed portion 48 includes a semi-circular recessed portion 48a, in order to allow a persons fingers to grip the recessed surface 29 of the rod 24 for manually pulling the hanger body to the deployed position. Note that the headliner also includes recessed portions for the clevis member 31 and its arms 33,34.

Figure 2:
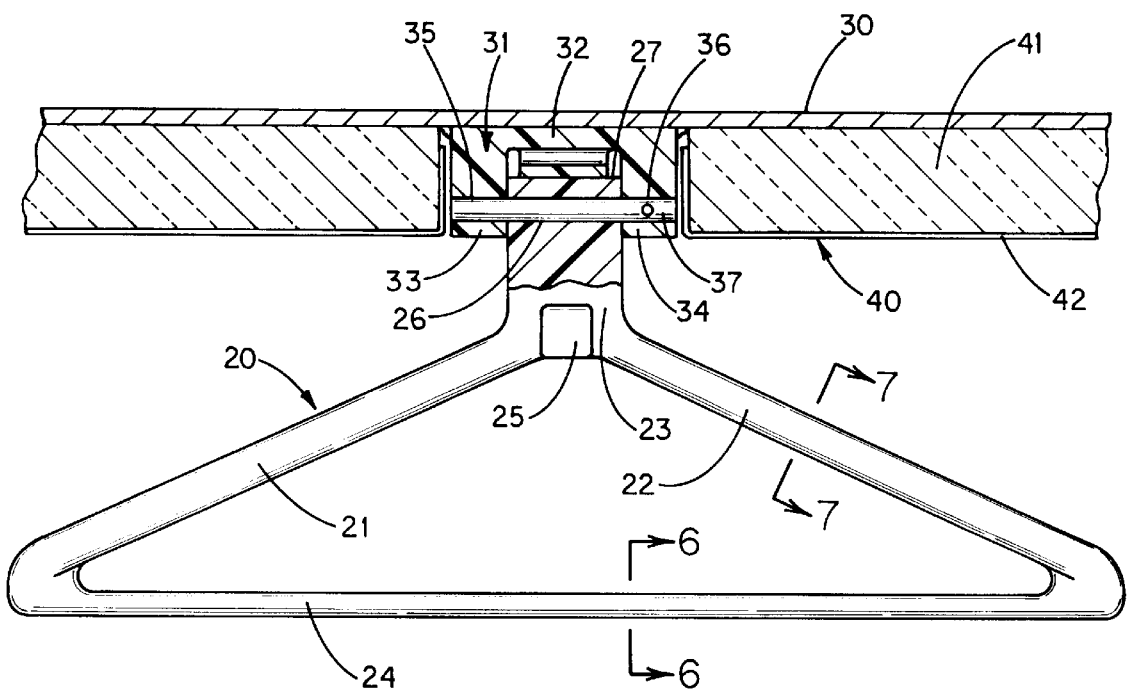
FIG. 2 is a side view of the hanger in a deployed position.
Figure 3:
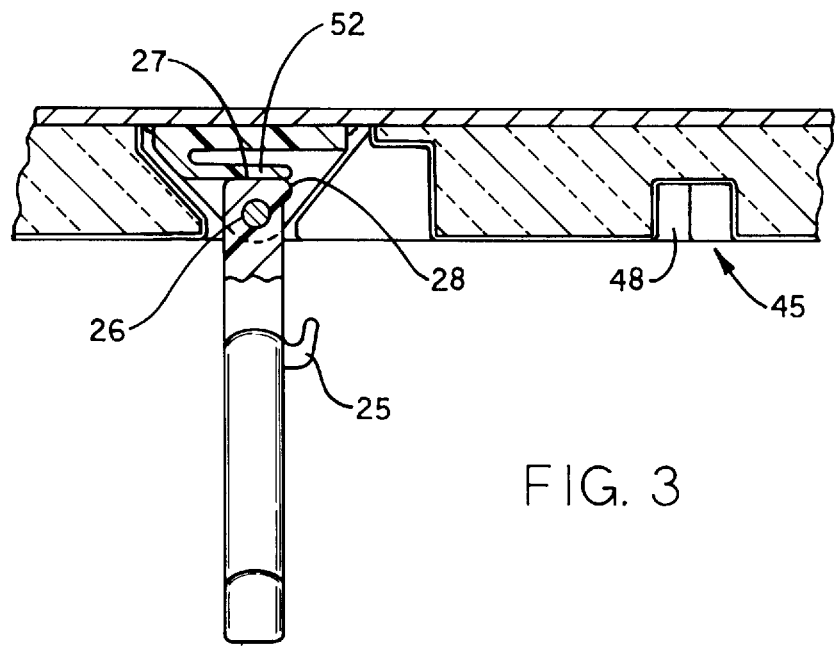
FIG. 3 is a rear end view of the hanger and headliner of the vehicle, with the hanger deployed.
Figure 4:
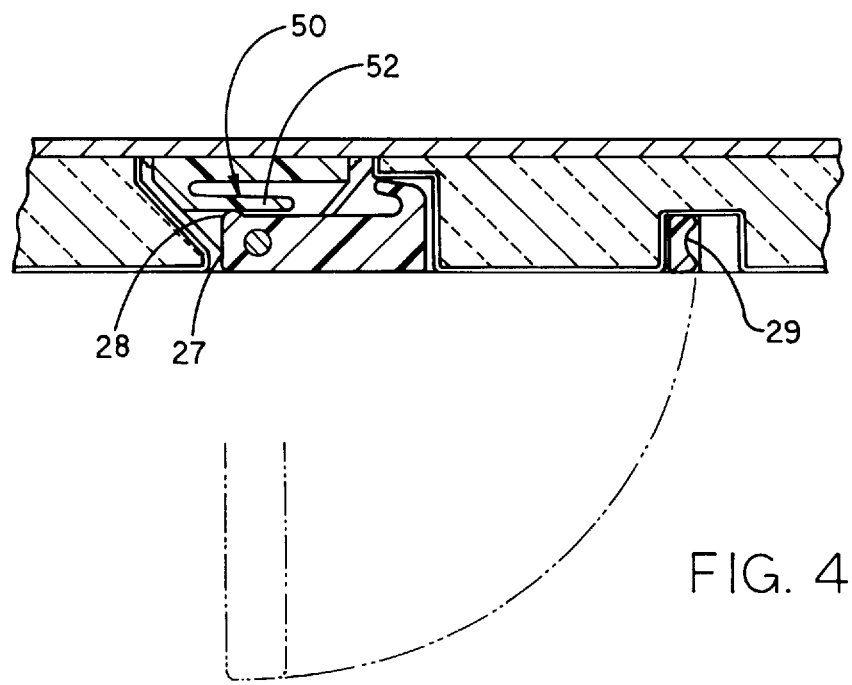
FIG. 4 is a rear end view of the hanger in the retracted position.
Figure 5:
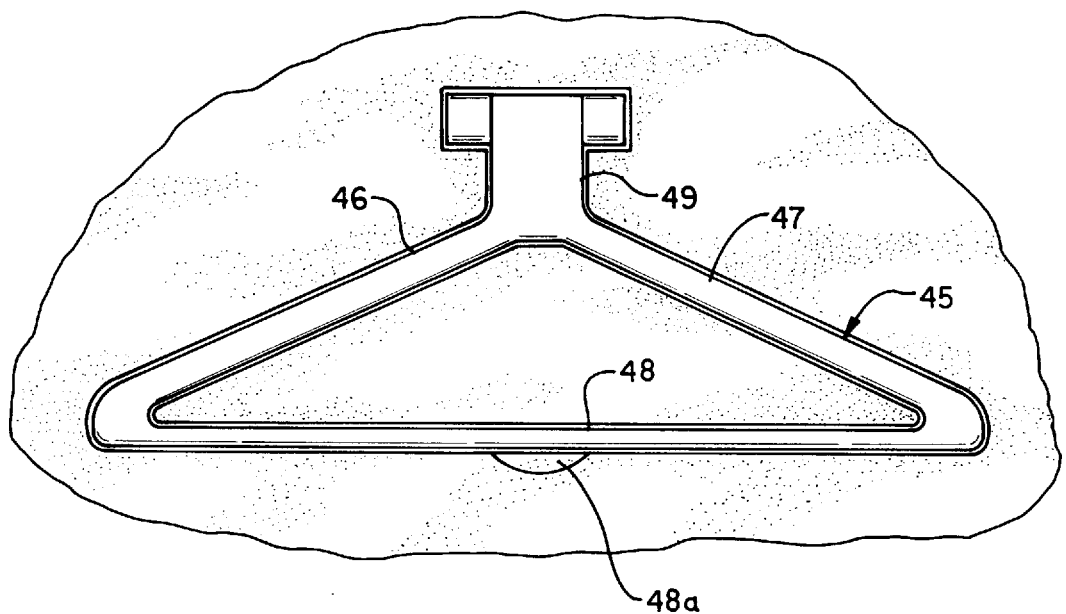
FIG. 5 is a view looking upwardly toward the vehicle headliner showing the retracted hanger.

Means are provided for retaining the hanger body in the retracted and deployed states. Referring to FIGS. 2–4, the retaining means comprises a spring means 50 disposed between the base member 23 of the hanger body and the base portion 32 of the clevis member 31. The spring means 50 is composed of a cantilevered, flexible spring member 52 integrally attached at one end to the base portion 32 of the clevis member 31. As is seen in FIG. 4, in the retracted position, the projection 28 is disposed on one side of the pivot shaft 37 and engages the spring 52. This results in a biasing force about the pivot shaft which tends to keep the hanger body in the retracted position. However, this biasing force is small enough to be overcome by manually pulling the hanger body downward and to its deployed position. As seen in FIG. 3, spring 52 engages the surface 27 in the deployed position, to keep the hanger body in the deployed position.

Figure 8:
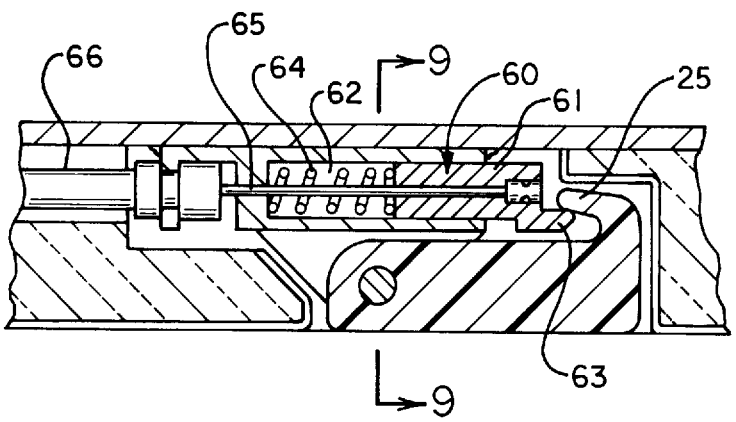
FIG. 8 is a view of an alternate embodiment of the invention.
Figure 9:
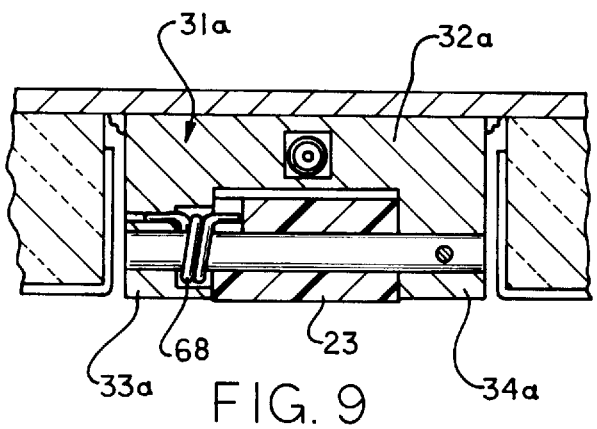
FIG. 9 is a cross-sectional view taken along 9—9 of FIG. 8.
Figure 10:
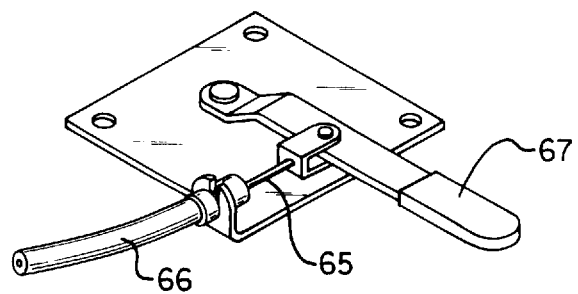
FIG. 10 is a view of an actuating mechanism associated with the embodiment of FIGS. 8 and 9.

Alternatively, as seen in FIGS. 8–10, the retaining means comprises a latching means 60 having a latching member 61 slidable within an aperture 62 formed in base member 32a. A projecting finger 63 is attached to one end of the latching member for engagement with the hook 25. A coil spring 64 is disposed within the aperture and engaged with the other end of latching member 61 to bias the finger towards engagement with the hook. Actuating cable 65 is provided so as to move the latching member against the bias of the spring and remove the finger from the hook. One end of the cable is attached to the latching member while to other end of the cable is attached to a pivoting actuating lever 67. The lever 67 acts as a release mechanism and is located in a place which is convenient to the user, such as under the dashboard of the vehicle. Sheath 66 surrounds the cable 65 in order to protect the cable. Referring to FIG. 9, it is seen that a torsion spring 68 is disposed around the pivot shaft, with one end of the spring fixedly attached to the clevis arm 33 and the other end contacting the base portion 23 of the hanger body. The spring 68 provides a constant biasing force tending to rotate the hanger body to the deployed position.

In use, the hanger body is initially kept in the retracted state by the finger 63 spring biased into engagement with the hook 25. Once deployment is desired the lever 67 is rotated so as to pull on the cable which detracts the finger and latching member against the bias of spring 64, and the biasing force of the torsion spring 68 then causes the hanger body to automatically pivot to the deployed position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

What is claimed as being new and desired to be protected by Letters Patent of the United States is as follows:

1. A retractable hanger attached to the inside of a vehicle, the vehicle including a roof and a headliner on the inside of the roof, comprising:
 a hanger body having arms for supporting clothes;
 a recessed contour in the headliner matching the shape of the hanger body;
 means for pivotally attaching the hanger body to the roof for permitting pivoting movements of the hanger body between a deployed position, allowing clothing to be hung on the hanger body, and a retracted position, where the hanger body is disposed within the recessed contour of the headliner; and
 wherein the hanger body is triangular shaped and comprises two of said arms connected to each other at a base end of the arms to define a hanger base, and a longitudinal rod connected to distal ends of the arms.

2. The retractable hanger of claim 1, wherein the hanger body in the deployed position is parallel with the side of the vehicle.

3. The retractable hanger of claim 1, further including a hook disposed at the hanger base.

4. The retractable hanger of claim 3, further comprising means for retaining the hanger body in the retracted position.

5. The retractable hanger of claim 4, wherein said retaining means comprises a spring means attached to the vehicle roof and engaging the hanger base.

6. The retractable hanger of claim 5, wherein the spring means is a plastic spring.

7. The retractable hanger of claim 4, wherein said retaining means is a mechanical catch means for engaging the hook.

8. The retractable hanger of claim 7, wherein the mechanical catch means comprises a spring-loaded latch releasable by a remote release mechanism located adjacent a dashboard of the vehicle.

9. The retractable hanger of claim 6, wherein the longitudinal rod includes a semi-circular recessed bottom surface, and said headliner includes a semi-circular recessed contour adjacent the portion of the recessed contour which receives the longitudinal rod, said recessed bottom surface and said semi-circular recessed contour facilitating pivoting of the hanger body from the retracted position to the deployed position over the force of the spring.

10. The retractable hanger of claim 8, wherein said means for pivotally attaching comprises a pivot shaft attaching the hanger base to the roof; further comprising a torsion spring surrounding the pivot shaft for causing pivoting of the hanger body to the deployed position upon release of the latch.

11. The retractable hanger of claim 1, wherein the vehicle includes a drivers seat, and the hanger body is disposed in the rear of the vehicle behind the drivers seat.

12. A retractable hanger attached to the inside of a vehicle, the vehicle including a roof and a headliner on the inside of the roof, comprising:
 a triangular-shaped hanger body having two angled arms extending from a hanger base and a longitudinal rod connecting distal ends of the arms, the hanger base including a hook attached thereto adjacent a base end of the arms;
 a recessed contour in the headliner matching the shape of the hanger body;
 means for pivotally attaching the hanger body to the roof for permitting pivoting movements of the hanger body between a deployed position, allowing clothing to be hung on the hanger body, and a retracted position, where the hanger body is disposed within the recessed contour of the headliner; said means for pivotally attaching comprises a clevis member secured to the roof, the clevis member having two spaced clevis arms extending from a base portion, and a pivot shaft, where the hanger base is disposed between the two spaced clevis arms and the pivot shaft extends through the two clevis arms and the hanger base;
 a plastic spring disposed between the hanger base and the base portion of the clevis member, and operatively engaged with the hanger base for retaining the hanger body in either of the retracted or deployed positions; and
 wherein the longitudinal rod includes a semicircular recessed bottom surface, and said headliner includes a semi-circular recessed contour adjacent the portion of the recessed contour which receives the longitudinal rod, said recessed bottom surface and said semi-circular recessed contour facilitating pivoting of the hanger body from the retracted position to the deployed position over the force of the spring.

13. A retractable hanger attached to the inside of a vehicle, the vehicle including a roof and a headliner on the inside of the roof, comprising:

a triangular-shaped hanger body having two angled arms extending from a hanger base and a longitudinal rod connecting distal ends of the arms, the hanger base including a hook attached thereto adjacent a base end of the arms;

a recessed contour in the headliner matching the shape of the hanger body;

means for pivotally attaching the hanger body to the roof for permitting pivoting movements of the hanger body between a deployed position, allowing clothing to be hung on the hanger body, and a retracted position, where the hanger body is disposed within the recessed contour of the headliner; said means for pivotally attaching comprises a clevis member secured to the roof, the clevis member having two spaced clevis arms extending from a base portion, and a pivot shaft, where the hanger base is disposed between the two spaced clevis arms and the pivot shaft extends through the two clevis arms and the hanger base;

a means for selectively retaining the hanger body in the retracted position, said selective retaining means comprises a latch member in the clevis base portion with a projecting finger movable between an engaged position with the hook and a disengaged position, a spring disposed in the clevis base portion and engaged with the latch member so as to bias the finger to the engaged position, and an actuating cable attached to the latch member and actuated by an actuating mechanism, so as to actuate the finger to the disengaged position, said actuating mechanism comprises a pivoting lever located adjacent a dashboard of the vehicle; and a torsion spring disposed around the pivot shaft so as to provide a biasing force to the hanger body, such that when the projecting finger is actuated to the disengaged position, the hanger body is biased by the torsion spring to the deployed position.

14. The retractable hanger of claim 5, wherein the longitudinal rod includes a semi-circular recessed bottom surface, and said headliner includes a semi-circular recessed contour adjacent the portion of the recessed contour which receives the longitudinal rod, said recessed bottom surface and said semi-circular recessed contour facilitating pivoting of the hanger body from the retracted position to the deployed position over the force of the spring means.

* * * * *